No. 690,891. Patented Jan. 7, 1902.
H. L. McCOY.
AUTOMATIC FEEDER OR ELEVATOR.
(Application filed Apr. 18, 1901.)
(No Model.) 3 Sheets—Sheet 1.
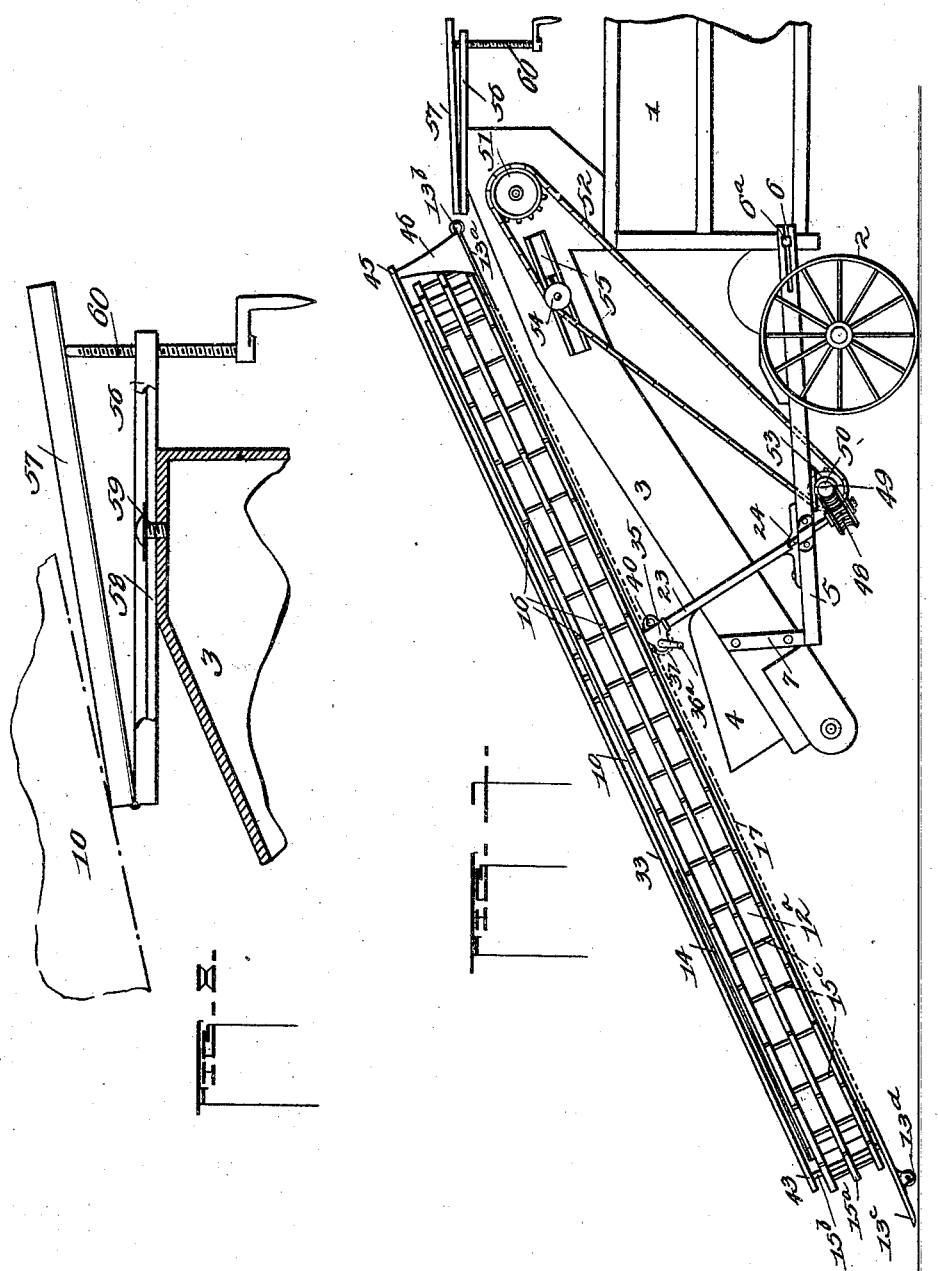
Witnesses
Inventor,
Henry L. McCoy
By
Atty.

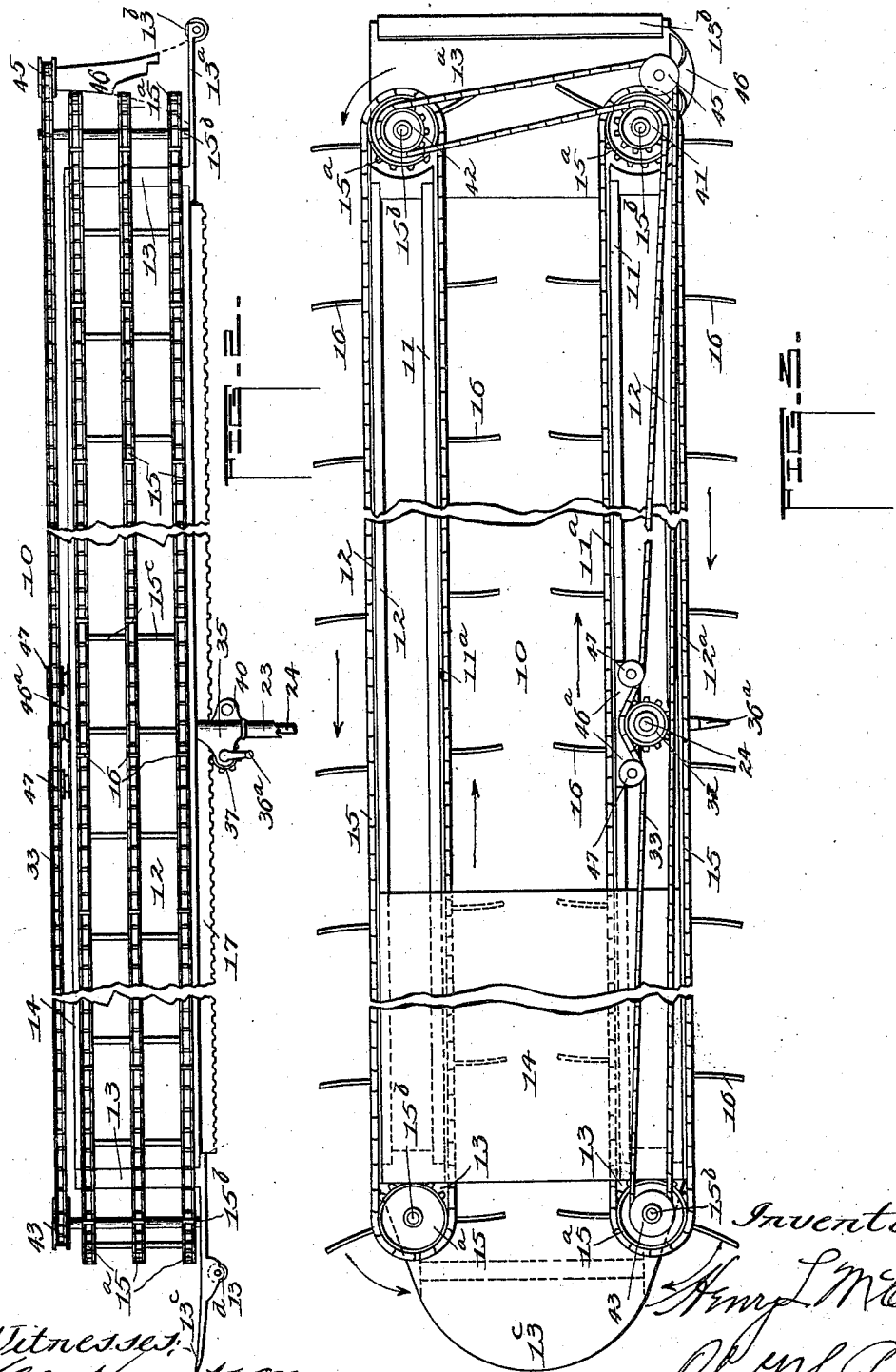

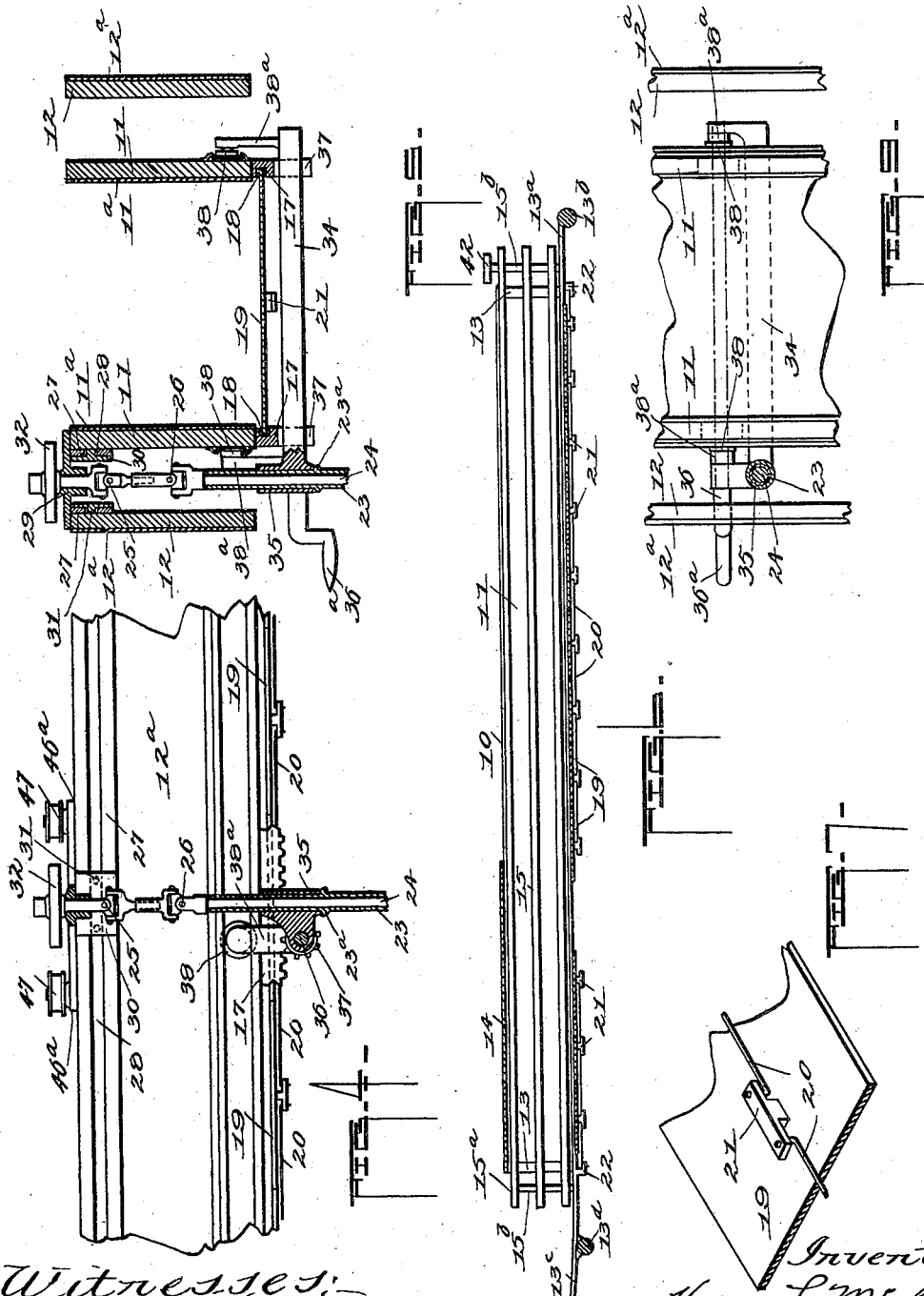

UNITED STATES PATENT OFFICE.

HENRY L. McCOY, OF MANITO, ILLINOIS, ASSIGNOR OF ONE-HALF TO CHARLES M. SMITH, OF PEORIA, ILLINOIS.

AUTOMATIC FEEDER OR ELEVATOR.

SPECIFICATION forming part of Letters Patent No. 690,891, dated January 7, 1902.

Application filed April 18, 1901. Serial No. 56,421. (No model.)

*To all whom it may concern:*

Be it known that I, HENRY L. MCCOY, a citizen of the United States, residing at Manito, in the county of Mason and State of Illinois, have invented certain new and useful Improvements in Automatic Feeders or Elevators; and I do hereby declare that the following is a full, clear, and exact description of the invention, which will enable others skilled in the art to which it appertains to make and use the same.

My invention has reference to an attachment for corn-shellers, comprising a force-feed gatherer and feeder.

More particularly does my invention relate to a feeder designed to be attached to this class of machine, which is automatic in its operation, arranged to be extended into the crib or other suitable place of storage where corn is kept, provided with suitable conveying means which gathers the corn and advances the same in a suitable manner in the feeder and is discharged into the "feeder-hopper" of the "head-section" of a sheller, the arrangement and attaching of the feeder being such as to enable the same to be extended to a point somewhat remote from the feeder-hopper or to have the forward end brought into close proximity thereto and at any suitable angle therewith, and further provided with a bottom movable the length of the feeder and so arranged as to permit of the discharge of corn at graduated points therein.

My invention consists, further, in the provision of suitable driving mechanism carried by the sheller proper and so arranged as to have suitable connection with the feeder for actuating the conveyer mechanism thereof and in such a manner as to not be affected when the feeder is extended or the forward end is in close proximity to the "hopper," or when it is desired to change the angle of the automatic feeder, the power mechanism being arranged and supported in such a manner that the same adapts itself to the various changes of the feeder.

While I have shown and described my automatic gatherer and feeder in connection with and arranged to deliver ear-corn to a gatherer and corn-sheller, it is to be understood that the sheller may be of any known construction, and as the same is applicable to several classes of machines either for elevating grain or shelled corn or may be attached to and actuated by suitable independent driving means, where the elevator could be used independent of other mechanism, such as a sheller or the like, I do not want to confine myself to the one application of the same, as hereinafter set forth, nor to the details of construction therein, as modifications could be made within the scope of my invention without departing from the principle herein disclosed.

The present method of gathering and conveying ear-corn from the ground, loads, piles, or cribs of corn is by attaching extra drag-feeders in one or more sections or by the provision of a supplemental conveyer device, in some instances arranged to have a swinging movement in connection with the sheller from a fixed point of the supplemental feeder at its upper end, which regulates and limits the movement thereof, but which in all cases it is absolutely necessary to hire labor to shovel the corn into the drag or supplemental feeder or conveyer, while it is convenient does not reduce the cost of shelling and does not permit the sheller being carried adjacent to the crib and depend on the movements of the feeder to reach the remotest parts of the crib to reach the corn. My device is designed to overcome these and many other objections and is what may be termed a "supplemental" automatic gatherer and conveyer or feeder of suitable construction and length carried in such a manner as to gather automatically and convey ear-corn to the feeder-hopper, is so constructed and supported that it will gather and discharge the grain at or near either end or at intermediate points of the conveyer, is capable of being turned or swung freely in any direction, whether the forward or rear ends are above the feeder-hopper or at intermediate points thereof, and the method of employing the conveying apparatus thereof provides for it a carrier arranged to have a sweep at the forward end to drag into the elevator automatically the corn without the assistance of labor, except with the man who operates and controls the movements of the gatherer and elevator, and the same is discharged therefrom into the feeder-hopper.

The invention consists, further, in the provision of details hereinafter more fully described and pointed out in the specification and the accompanying drawings, in which—

Figure 1 represents the forward end of a sheller in elevation with my improved automatic feeder or conveyer attached thereto. Fig. 2 is an enlarged elevation of one side of the feeder detached. Fig. 3 is a plan view of Fig. 2. Fig. 4 is an elevation in section, enlarged, of the power mechanism, supported by the conveyer, for actuating the carrier of the conveyer. Fig. 5 is a similar view, but at an angle transverse to the one illustrated in Fig. 4. Fig. 6 is a longitudinal section of the conveyer. Figs. 7 and 8 are details of certain parts. Fig. 9 is a plan view of a section of the conveyer.

In the drawings like numerals refer to corresponding parts throughout, in which 1 refers generally to the forward end of a sheller mounted on the wheels 2, and 3 refers to the head-section, having a swinging movement in connection therewith, and is provided with the feeder-hopper 4 at its outer end. The same may be suitably supported and be provided with a carrier, conveyer, or drag-belt constructed and actuated in any suitable manner.

To further illustrate and describe the application of my automatic feeder or conveyer, I have shown a novel means of raising and lowering the head-section and provided in combination with the same suitable mechanism for actuating the carrier of my automatic feeder device, which is as follows: 5 is a suitable supporting-frame extending out from the sheller and having a pivotal connection therewith at $6^a$, the rear end being slotted, as at 6, and held by means of a suitable bolt. The frame supports the lower end of the head-section 3 by means of the frame-pieces 7, and when it is desired to elevate or lower the head-section the bolt holding the rear ends of the frame 5 is loosened, the frame swung, and the bolt reset, which will allow of such movement as may be desired for this frame and head-section.

In carrying out my invention an automatic supplemental conveyer device or feeder is provided, referred to as a whole as 10, which is composed of the side frame parts 11 11 and the supplemental frame parts 12 12, carried parallel with the frame parts 11 11 and are connected together or held in suitable supports or castings 13 13 at opposite ends. The rear end is provided with the bottom extension $13^a$ and provided with the roller or spindle $13^b$. The forward end is somewhat similar, but much longer and has a tapered curved extension $13^c$ and is provided with a roller or spindle $13^d$, as shown. The forward extension of the support or casting 13 is arranged to act as a scoop, which will plow itself under the corn and enable the same to slide very easily into the conveyer. The rear extension acts as a support, and the rollers assist in moving the conveyer when coming into contact with obstructions. The forward upper portion of the conveyer I have shown covered at 14, for the reason that it not only protects the same, but keeps the corn from falling into the conveyer and clogging the same when the forward end is shoved beneath a pile of corn. The frame parts 11 12, which are designed to be made of wood, are covered with the metal plates $11^a$ $12^a$ and on their inner and outer faces, respectively.

The carrier or conveyer proper may be of any preferred construction; but I have shown the same consisting of a series of chain belting 15, traveling around the sprockets $15^a$ on the shafts $15^b$ and provided with the fingers or prongs 16, projecting out therefrom. This method of conveying the corn I believe to be novel, and the arrangement of the carrier is such as to insure the corn being drawn into the conveyer. As will be seen by an examination of the drawings, the chain belting 15, which is here shown as a series of three distinct belts, is connected by the straps $15^c$ to insure a steady and compact carrier, which also keeps the same from sagging, the same traveling parallel with and around the supports or frames 11 and 12, with the prongs or fingers traveling in lines transverse therewith and in a large radius, giving a wide sweep to the carrier at its outer end and gathering the corn as it travels and directs the same into the feeder, from which it is discharged.

The bottom of the conveyer is of a novel construction, permitting of the discharge of the corn at suitable points in the length of the same. On the lower side or bottom edges of the frame parts 11 are shown cog-racks 17, extending the length thereof, the function of which will be hereinafter described, and on the inner faces are provided the elongated slots or grooves 18, in which is carried a series of short sections or metal plates 19, enough to provide for the conveyer a bottom the length thereof, with the exception of space the length of one section, which enables me to provide, substantially, an extensible bottom, as by such provision the sections may be moved so as to leave the discharge-opening at any suitable point intermediate the two ends. These are retained in their positions when it is desired to fix them by means of the retaining-rods 20, of which a series goes with each elevator, arranged to be connected with suitable depending lugs or castings 21 on the under side of the plates or sections 19, the outer rods being connected with the fixed lugs 22 of the elevator. This arrangement is simple and convenient, and the locking mechanism therefor provides against any movement of the same when material is being passed over the same, and the rods may be easily and readily attached or detached to permit the adjustment of the plates or sections 19.

The mechanism for supporting and permitting of the ready adjustment of the conveyer that it may swing and be moved on its support and the means of driving the chain belting or carrier will now be described.

23 is a tubular standard or support of suitable length, provided with the bracket or supports at its lower end, which are fixed to the frame 5. This support 23 serves as a journal-support for the driving-shaft 24 for the conveyer, fixed relative to the movement of the conveyer, but flexible in its length to accommodate the movement of the conveyer and yet retain its bearing relation to such angle to actuate means for moving the carrier thereof. The shaft at its upper end is provided with the universal-joint sections, as at 25 26, which is an old form of construction, yet, I believe, novel when applied in this manner and for this purpose. On the inner matching faces of the frame parts 11 and 12 and at their upper ends I have provided bearing-plates 27, extending the length of the frames and separated sufficiently to provide a channel 28.

29 is a casting and journal-support for the upper end of the driving-shaft 24, which has a bearing relation with the conveyer and yet by reason of the universal joints in the shaft will accommodate itself to the angles of the conveyer when being adjusted, the same being provided with the depending plates 30, provided with the studs 31, carried in the channel 28. In this manner of carrying the journal for the upper end of the drive-shaft and by reason of the universal-joint section 25 being fixed therein the same may accommodate itself to any angle that it may be desired to move the elevator, and the driving-sprocket 32 thereon, which is engaged by the sprocket-chain 33 for actuating the carrier, will follow the angle thereof and at all times be in such a position with reference to the angle of the driving ends of the carrier as to be in continuous mesh therewith. The universal joints 25 26 are adjustable with reference to each other to permit, if necessary, any extension of the shaft 24 when the body of the elevator 10 is raised or lowered. This is accomplished by extending and squaring a portion of the section 25 and telescoping it in the squared opening in the section 26 thereof.

34 is a transverse bearing-frame having a tubular body portion 35, carried by the support 23 and supported thereby on the flange-ring 23$^a$ of the support and in such a manner that it may swing freely around the support or standard 23. This bearing-frame 34 is arranged to carry the weight of the conveyer as well as carry the means for enabling the forward and rearward adjustment of the conveyer or swing it into desired positions. This is accomplished in the following manner: 36 refers to a transverse shaft or spindle supported in any suitable manner by the frame 34 and carries the rack-pinions 37, intermeshing with the cog-racks 17 of the conveyer, by which the same may be moved. On the outer end of the spindle is provided the operator's handle 36$^a$ for rotating the same to impart movement to the elevator through the cog-rack 17. This movement is further carried out and a supplemental support provided by the provision of the flanged wheels 38 38, which are supported by means of the frame-supports 38$^a$ 38$^a$ at opposite ends of the shaft 36 and carried in such a manner as the shaft may turn in and yet support the same The same are arranged to travel in the channels formed by the straps 39 39 on the outer faces of the frame parts 11 of the elevator, the application of the same preventing any upward movement of the elevator if at any time in moving it comes into contact with a stubborn obstruction. I have also shown on the opposite side of the frame 34 to the spindle 36 a support 40, arranged for the insertion of a suitable bar or rod to be controlled by the operator to enable him to shift or turn in any direction the elevator, as it may seem advisable, it being understood that the same through the support 34 and the tubular extension 35 is permitted to swing on the standard or support 23.

A simple but effective method of driving the chain belting (designated 15) is, through the sprockets 15$^a$, carried by the vertical shafting 15$^a$, journaled in the heads 13, which join the ends of the elevator proper. On the outer ends of the shafts 15$^b$ at the head end of the elevator I provide the driving-sprockets 41 42, and at the forward end, on the driving side of the elevator, I provide the idler 43, and 33 is a sprocket-chain which is actuated by the driving-sprocket 32, which travels around the sprocket 41 and thence to and around the sprocket 42 and thence around the idler 45, supported by the head 13 on the arm extension 46, and from thence to and around the idler 43. To insure the chain being engaged by the driving-sprocket 32 at all times, either when the elevator is out its full length or drawn inward or when the shaft 24 is at any intermediate point, I provide on the casting or journal 29 the plate extensions 46, which have suitably journaled thereon the idlers 47, arranged in such a manner that the drive-chain passing around the forward side of the same passes around the rear side of the drive-sprocket, which will insure of such engagement at all times.

The mechanism for driving the shaft 24 is, by the provision of a worm-wheel 48 on the lower end of the shaft 24, arranged to intermesh with a worm 49 on a transverse shaft 50, which is journaled on the swinging frame 5 and suitably driven by means of a sprocket-and-chain connection 51 52 from the sheller to the sprocket 53 on the shaft 50. It is necessary to provide for the adjustment or elevation of the frame 5, and to provide for this the chain 52 is carried over the idler 54, supported in an adjustable bearing in the frame part 55, attached in any suitable manner to the upper end of the head-section.

I have further provided, in combination with the upper extreme extension of the head-section, means for supporting the upper end of the automatic feeder 10 and also provide for the elevation of said support when it is desired to elevate the upper end of the same, which consists in the provision of the beams 56 57, suitably hinged together at their outer ends, the beams 56 being secured to the head-section and adjustable lengthwise of itself thereon by the arrangement of a longitudinal groove 58 and being retained in position by the bolt 59. In the inner end of the beam 56 I provide a nut, which is engaged by a screw 60 of suitable length, and the beam 57, which is hinged to the beam 56 and at its inner end resting on the screw 60. It will be seen that any movement of the screw will tend to either raise or lower the supporting-beam 56, and hence if the elevator at its upper end is resting on the support 56 any upward movement thereof would result in a changing of the bearing of the elevator. This means of supporting and raising the upper end of the elevator and the driving mechanism from the sheller to the drive-shaft 24, it will be seen, may be easily modified, as well as the manner of driving the belting-shafts 15ª; but as I do not wish to limit myself I do not claim specifically the exact construction, but have shown this simple means of arranging the parts to show the complete application of the automatic feeder or elevator to this class of machine, as it will be readily seen that with few modifications the same may be adapted for machines in several classes.

The object which I have in view is the provision of an automatic supplemental gatherer and feeder for shellers or similar machines, which may be arranged to automatically gather the corn and discharge the same into the feeder-hopper of the machine, combining in its application such movements, in combination with a stationary driving means with relation to the movements which may be imparted to the feeder, that the means of driving the belting will always be in mesh. The movement which I desire to impart to the feeder is to so arrange its power device that it will be in easy reach of the operator through the spindle 36 and the pinions 37, engaging the racks 17, for extending the length of the conveyer relative to its position with the feeder-hopper and to shorten the same when desired, and by means of the insertion of a suitable bar or rod in the support 40 the angle of the feeder may be changed as desired, and by the arrangement of the extensible plates 19 the discharge-opening in the bottom may be located at any suitable point therein. This, with the manner of carrying the shaft 24 and the supporting means for the elevator, enables me to obtain all these desired movements in this class of machines with the least amount of trouble and with a very convenient and efficient device.

Having thus fully described my invention, what I claim, and desire to secure by Letters Patent of the United States, is—

1. An attachment for corn-shellers, comprising a frame with supplemental side frames, supported on a standard projecting from the sheller proper, a force-feed gatherer traveling through the carrier and around the supplemental frames, means of extending the carrier bodily on its support and a sectional bottom therefor slidable in ways beneath the carrier and means of locking the same in adjusted positions, substantially as described.

2. In a corn-sheller, the combination of a tubular standard supported on the sheller-frame, a swinging frame journaled on the standard, a carrier-frame supported by the swinging frame, said carrier provided with rack-bars engaged by pinions on the swinging frame for extending the carrier bodily, a force-feed gatherer and a shaft journaled in the standard having a universal joint in its length and adapted to impart movement to the force-feed gatherer, substantially a described.

3. In combination with a corn-shelling machine, a tubular standard supported on the sheller-frame, a swinging frame supported on the standard and a carrier supported by the swinging frame arranged with devices engaging mechanism whereby the carrier may be extended bodily on the swinging frame, a scoop on the forward end of the carrier, a force-feed gatherer and a shaft journaled in the tubular standard for actuating the gatherer and a sectional bottom slidably arranged in ways beneath the carrier, and devices for connecting the sections in a series, substantially as described.

4. The combination with a corn-shelling machine, a tubular standard supported from the sheller, a transverse frame-support having a swinging connection with and supported by the standard, a carrier-frame supported by the transverse frame provided with rack-bars engaged by pinions carried on a transverse spindle of the standard, a scoop at the forward end of the carrier and a bottom formed of sections slidable in ways in the rack-bars, force-feed gatherers arranged to automatically drag material into and convey it to the discharge of the carrier, and a shaft journaled in the standard supporting the carrier and means for actuating the force-feed from said shaft, substantially as described.

5. An attachment for corn-shellers, comprising a carrier arranged with force-feed gatherers journaled in such a manner as to travel around the side frame-supports thereof, a scoop at its forward end, a tubular standard extending up from the sheller-frame, a transverse support of the standard arranged beneath the carrier and the means shown for supporting the carrier from the support, rack-bars under the carrier and pinions journaled in the transverse supports engaging said racks for moving the carrier bodily, a shaft journaled in the standard having a universal coupling in its length, a sprocket-chain drive for the gatherer arranged to be actuated by the shaft in the standard and the means of actuating said shaft, substantially as described.

6. An attachment for corn-shellers, comprising a carrier-frame movably supported from a tubular standard mounted on a frame-support of the sheller capable of being raised or lowered, a transverse swingable support from the standard, longitudinal guideways on the sides of the carrier-frames and rollers arranged to travel in said guides supported from the swingable frame, a sectional bottom of the frame adapted to be slidably connected and disconnected in the manner shown, gathering devices of the carrier arranged to automatically drag material into and convey it to the discharge of the carrier and a shaft journaled in the standard for imparting movement to the gatherer and means provided for extending the carrier-frame bodily on the swingable frame, substantially as herein shown and described.

7. An attachment for corn-shellers supported and movable on a standard mounted on a swinging frame of the sheller and having side frames 11 and supplemental side frames 12, a scoop at its forward end, cog-racks arranged beneath the frames 11 and pinions engaging said racks for moving the carriers bodily, a sectional bottom for the frame sliding in grooves in the rack-bars and the means of connecting and detaching the sections, devices supported by said standard supporting the carrier and having a movable relation therewith, of force-feed gatherers traveling around devices at the forward and rear ends of the carrier and having a bearing relation with the inner and outer faces of the frames 11 and 12 of the carrier, means for actuating the gatherers and the arrangement of mechanism for swinging the carrier on its support, substantially as described.

8. An attachment for corn-shellers, comprising a carrier-frame supported from a tubular standard 23, side frame-supports 11 and 12 of said frame, a series of belts connected and provided with fingers traveling around the supports, a transverse bearing-frame 34 supporting the flanged wheels 38 arranged to travel in channels on the sides of the supports formed by the straps 39, cog-racks of said frame engaged by rack-pinions for shifting the carrier bodily through the cog-racks, a sectional bottom of said carrier, a driving-shaft for said belts journaled in the standard and having a universal coupling in its length, the upper end of said shaft journaled in a bearing provided with devices traveling in a channel arranged between the supports 11 and 12 and means of connecting and detaching the sections of the bottom and means for swinging the support bodily, substantially as described.

9. In combination, the carrier 10 provided with oppositely-arranged gathering devices movable longitudinally in the carrier, supplemental side supports of the carrier, a tubular standard for supporting the carrier and a transverse support of said standard, straps 39, forming a longitudinal channel, flanged wheels 38 traveling in said channels and supported by the transverse support, a shaft in the standard and connections with devices for actuating the gathering devices, bearing-plates 27 of said carrier forming a channel for the upper end of said shaft and provided with studs carried in said channel, a series of bottom sections or plates 19 movably carried in the carrier and connecting-rods 20 between the plates, all arranged substantially as herein shown and described.

In testimony whereof I affix my signature in presence of two witnesses.

HENRY L. McCOY.

Witnesses:
ROBERT N. McCORMICK,
CHAS. W. LA PORTE.